Nov. 9, 1948.　　　　R. A. TROIDL　　　　2,453,476
FILM SPOOL GUIDE RING
Filed March 8, 1946

Inventor
Robert A. Troidl,

By Clarence A. O'Brien
and Harvey B. Jacobson
Attorneys

Patented Nov. 9, 1948

2,453,476

UNITED STATES PATENT OFFICE 2,453,476

FILM SPOOL GUIDE RING

Robert A. Troidl, Lake George, N. Y.

Application March 8, 1946, Serial No. 653,085

2 Claims. (Cl. 242—71)

1

This invention relates to improvements in moving picture cameras, and more particularly to a device for preventing the unspooling of the feed spool in magazine type film cameras.

An object of the invention is to provide means for attachment to a magazine or a film spool comprising a guide ring for preventing unspooling of the film due to periods of vibration that are present in certain uses that the camera is put to.

Another object of the invention is to provide either an attachment, or a built in film spool guide ring for magazine type moving picture film feed spool, which will prevent unspooling of the film when the camera is not in operation.

A further object of the invention is to provide an improved film spool guide ring for magazine film feed spools which will be highly efficient in use, and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
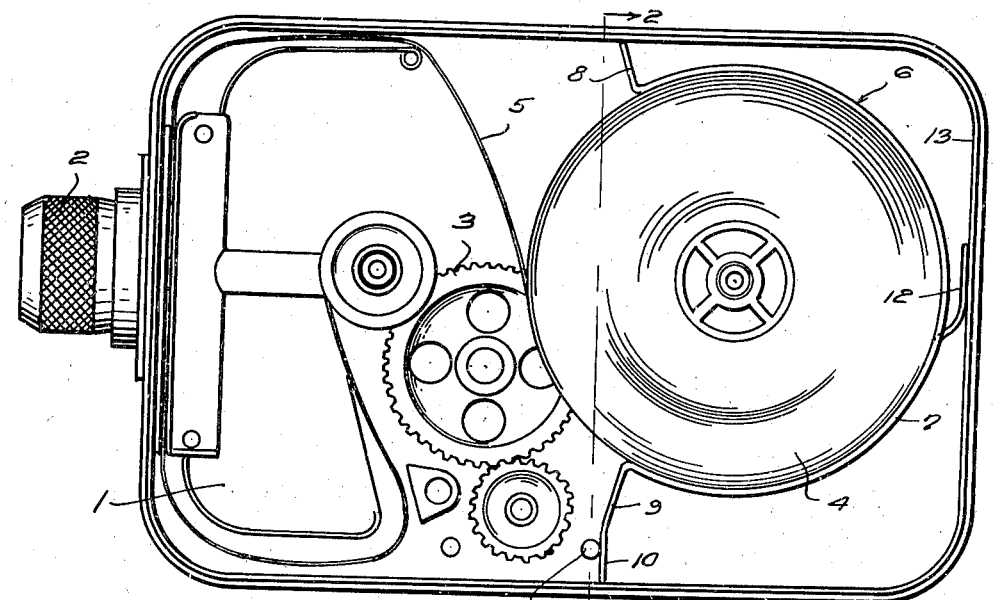
Figure 1 is a side elevation of a magazine type film camera with a side removed to show the improved film spool guide ring in position on the feed spool therein.
Figures 2, 3:
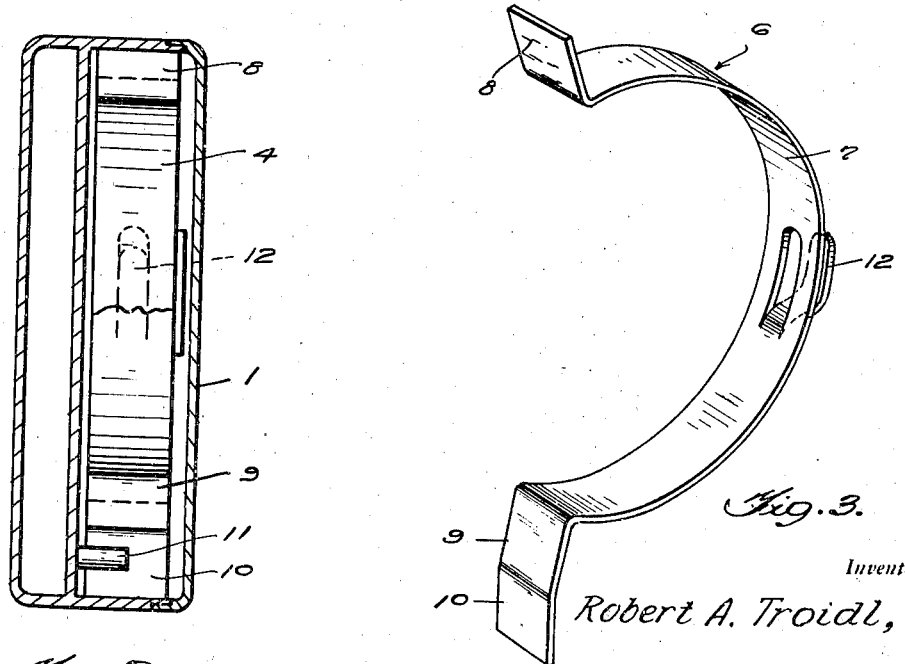
Figure 2 is a sectional view taken on the line 2—2 of Figure 1, with supporting spindle removed.
Figure 3 is a perspective view of the improved film spool guide ring.

In carrying out the invention, there is provided a magazine type moving picture camera having a body or housing 1, lens mount 2, driving mechanism 3, and a feed spool 4 for the film 5, all of which is well known in the camera art.

The instant invention comprises a film spool guide ring 6 having a flexible or resilient spring body portion 7, arcuate in shape, and formed with the bearing extremities 8 and 9, at its opposite ends which may be changed to conform with the construction of the magazine. The bearing extremity 8 is integrally formed at the upper end of the body portion 7 of the guide ring 6, and is bent at substantially right angles thereto, and when said guide ring is on the feed spool 4, said bearing end 8 will engage the inner surface of the top of the camera case or housing 1 at a point forwardly of the adjacent end of the body portion 7. The bearing end 9 extends at substantially right angles to the adjacent body portion 7 of the guide ring 6, and terminates in an angled camera housing contacting bearing portion 10 bent at an acute angle to the portion 9. The portion 10 is adapted to engage the cross pin 11 extending through the camera housing 1, and both the ends 8 and 11 extend well forwardly and beyond the center line vertically of the feed spool 4.

The spring bearing tongue 12 is struck from the body portion 7 of the guide ring 6 at a point substantially equidistant from the ends 8 and 9, and is adapted to engage and seat on the inner surface 13 of the back of the camera housing 1.

Since the guide ring 6 is resiliently formed, and since the ends 8 and 9, and the resilient tongue 12 are spaced at approximately 120° apart, or equidistant from each other, the guide ring when clipped over the film 5 on the feed spool 4 will firmly hold the same against unspooling when the camera is subjected to severe periods of vibration.

It will be understood that the improved film feed spool guide ring may be made as an attachment to be clipped over the feed spool, or it may be made integrally as a part of the magazine in any manner to accomplish the desired results.

While the preferred embodiment of the invention has been illustrated and described, it will be understood that it is not intended to limit the invention to the scope of the disclosure, as many minor changes in detail of construction may be resorted to without departure from the spirit of the invention.

Having thus described my invention what I claim as new and desire to secure by Letters Patent of the United States is:

1. In combination with a moving picture camera having a film feed spool, film rolled upon said feed spool, a resilient arcuate film guide ring disposed concentrically about said feed spool and film engageable with said film as it feeds from said feed spool, radially extending bearing extremities on the ends of said guide ring engageable with the opposite inner edges of said camera, a resilient positioning and bearing tongue struck from the guide ring between said bearing extensions engageable with the inner end of said camera, and a cross pin disposed transversely of said camera engaged by one of said bearing extremities forming a positioning stop for said guide ring.

2. In combination with a moving picture camera having a film feed spool, film rolled upon said feed spool, a resilient arcuate film guide ring of more than a semi-circle in length disposed concentrically about said feed spool and film engageable with said film as it feeds from said feed spool, radially extending bearing extremities on the ends of said guide ring engageable with the opposite inner edges of said camera, a resilient positioning and bearing tongue struck from said guide ring between said bearing extensions engageable with the inner end of said camera, and a cross bar disposed transversely of said camera engaged by one of said bearing extremities forming a positioning stop for said guide ring.

ROBERT A. TROIDL.

REFERENCES CITED

The following references are of record in the file of this patent:

UNITED STATES PATENTS

| Number | Name | Date |
|---|---|---|
| 662,762 | Brownell | Nov. 27, 1900 |
| 1,667,536 | Chanier | Apr. 24, 1928 |
| 1,686,650 | Chanier | Oct. 9, 1928 |
| 2,137,601 | Abrams | Nov. 22, 1938 |
| 2,381,033 | Bolsey | Aug. 7, 1945 |